United States Patent Office 3,029,130
Patented Apr. 10, 1962

3,029,130
PLUTONIUM RECOVERY FROM NEUTRON-BOMBARDED URANIUM FUEL
Raymond H. Moore, Kennewick, Wash., assignor to the United States of America as represented by the United States Atomic Energy Commission
No Drawing. Filed Sept. 21, 1960, Ser. No. 57,593
9 Claims. (Cl. 23—14.5)

This invention deals with a method of processing fuel material of neutronic reactors and in particular with the separation and recovery of plutonium. The invention is applicable to chlorinatable neutron-bombarded mixtures, such as those of uranium, plutonium and fission product oxides or to alloys or mixtures of these metals. The process is especially valuable for treating neutron-bombarded uranium-oxide fuels as they are used in the so-called plutonium recycle test reactors; these reactors are described, for instance, in report HW–50700, published by General Electric Company. Uranium-aluminum alloys are also in use in other low-temperature reactors.

Heretofore such fuel material has been processed by dissolving the metal or oxidic mass in fused alkali metal chloride-aluminum chloride of about equimolar proportions and then selectively reducing the uranium chloride formed with aluminum metal. This process is the subject matter of U.S. Patent No. 2,948,586 granted to applicant on August 9, 1960.

The process of said copending application has one drawback, namely that the uranium is extracted there instead of the plutonium; this means that the bulk of the mixture is removed from a very minor quantity of plutonium and fission product chlorides.

It is an object of this invention to provide a process for the separation of plutonium from uranium present in neutron-bombarded oxidic or metallic fuel materials in which the plutonium is extracted away from the uranium.

It has been found that certain chloride mixtures, when molten, are immiscible with molten aluminum chloride-potassium chloride double salts of about equimolar composition, hereinafter simply called "double salt." These chloride mixtures immiscible with the double salt are those containing from 40 to 60 mole percent of lithium chloride, from 15 to 40 mole percent of sodium chloride with or without potassium or calcium chloride in a proportion of from 35 to 40 mole percent. These double-salt-immiscible mixtures will be referred to hereinafter as "plutonium extractant" for obvious reasons given below.

It has furthermore been found that a compound of tetravalent uranium, when contacted with a mixture of the plutonium extractant and the double salt, is preferentially taken up by the double salt, while a compound of trivalent uranium is preferentially taken up by the plutonium extractant; plutonium trichloride also prefers the latter. The plutonium extractant is heavier than the molten double salt and therefore settles at the bottom of the container, while the double salt always forms a layer on top of it.

The process of this invention thus comprises introducing the uranium-plutonium fuel material into an about equimolar mixture of aluminum chloride and potassium chloride heated to a temperature of above 260° C., whereby uranium and plutonium are dissolved in the molten double salt as the tetrachlorides; heating the mixture thus obtained to above 700° C., whereby dissolution of the fuel is brought to completion, plutonium tetrachloride is decomposed to plutonium trichloride and chlorine is volatilized; thoroughly mixing with the reaction mass thus obtained a plutonium extractant composed of from 40 to 60 mole percent of lithium chloride, from 15 to 40 mole percent of sodium chloride with or without potassium or calcium chloride in a quantity of from 35 to 40 mole percent, whereby it melts, preferentially extracts the plutonium trichloride and forms a separate phase on the bottom of the container, while uranium tetrachloride preferentially remains in the double salt layer floating on top of the plutonium extractant; and separating said double salt layer from the plutonium-containing phase.

As indicated above, various compositions have been found to be immiscible with the equimolar aluminum chloride-potassium chloride double salt. For instance, a mixture containing from 45 to 55 mole percent of lithium chloride, from 40 to 30 mole percent of potassium chloride and from 13 to 17 mole percent of sodium chloride has been found to yield satisfactory results; from these, the composition containing about 50 mole percent of lithium chloride, 15 mole percent of sodium chloride and 35 mole percent of potassium chloride proved to be the very best. Other double-salt-immiscible extractants suitable for this process contained about 40 mole percent of lithium chloride, 20 mole percent of sodium chloride and 40 mole percent of calcium chloride or 60 mole percent of lithium chloride and 40 mole percent of sodium chloride.

The amount of double salt preferably used is about 3 to 10 times the weight of the plutonium-containing uranium fuel material to be treated, and the plutonium extractant is added in about the same amount as the double salt.

The conversion of plutonium tetrachloride to the trichloride is advantageously carried out in an inert atmosphere, such as argon or helium. The temperature preferred for this step is between 700 and 750° C.

In the following an example is given to illustrate the process of this invention.

*Example*

An unweighed portion (about 2 grams) of a solid plutonium dioxide-uranium dioxide solution (weight ratio about 1:5) was mixed with 15.9 grams of the equimolar potassium chloride-aluminum chloride double salt. The mixture obtained was melted in an argon atmosphere and held at a temperature of between 700 and 750° C. for one hour, after which the oxides had completely dissolved.

15.15 grams of a ternary salt mixture containing 50 mole percent of lithium chloride, 35 mole percent of potassium chloride and 15 mole percent of sodium chloride were then added to the melted mixture, and the temperature of between 700 and 750° C. was maintained for another 15 minutes. The reaction mass was then permitted to cool for solidification, which took between two and three minutes. Samples of both phases were then analyzed. The double salt top layer contained 2.02% of uranium and had $2.88 \times 10^8$ d./m./g. The bottom phase of the ternary salt contained 1.00% of uranium, and the plutonium count was $7.5 \times 10^8$ d./m./g. This means that about 70% of the plutonium present had been extracted into the ternary salt but only 33% of the uranium.

The separation, of course, can be improved by repetition of the extraction process.

Each phase can then be treated for recovery of the uranium and plutonium metal, respectively. For uranium chloride reduction, aluminum can be added to the salt mixture, as is described in the above-mentioned copending application Serial No. 750,835. The plutonium can be recovered by methods known to those skilled in the art. The reduction of the chlorides is not part of this invention.

It will be understood that the invention is not to be limited to the details given herein but that it may be modified within the scope of the appended claims.

What is claimed is:

1. A method of recovering plutonium from a chlorinatable neutron-bombarded fuel material containing said plutonium together with uranium, comprising immersing said fuel material in a molten about equimolar mixture of aluminum chloride and potassium chloride whereby uranium and plutonium are dissolved as the tetrachlorides; heating the mixture obtained to above 700° C. whereby the plutonium tetrachloride is decomposed to plutonium trichloride and chlorine is volatilized; mixing with the reaction mass a plutonium extractant containing from 40 to 60 mole percent of lithium chloride, from 15 to 40 mole percent of sodium chloride and from 0 to 40 mole percent of a chloride selected from the group consisting of potassium chloride and calcium chloride, whereby the plutonium extractant melts, preferentially extracts plutonium trichloride and settles at the bottom as a separate phase, while uranium tetrachloride preferentially remains in the double salt layer floating on top of the plutonium extractant; and separating said bottom phase from the top layer.

2. The process of claim 1 wherein conversion of plutonium tetrachloride to the trichloride is carried out in an inert atmosphere at a temperature of between 700 and 750° C.

3. The process of claim 2 wherein the inert atmosphere is argon gas.

4. The process of claim 2 wherein the plutonium extractant is a salt mixture consisting of from 45 to 55 mole percent of lithium chloride, from 40 to 30 mole percent of potassium chloride and from 15 to 17 mole percent of sodium chloride.

5. The process of claim 4 wherein the extractant contains 50 mole percent of lithium chloride, 15 mole percent of sodium chloride and 35 mole percent of potassium chloride.

6. The process of claim 2 wherein the extractant consists of 40 mole percent of lithium chloride, 20 mole percent of sodium chloride and 40 mole percent of calcium chloride.

7. The process of claim 2 wherein the extractant consists of 60 mole percent of lithium chloride and 40 mole percent of sodium chloride.

8. The process of claim 2 wherein the double salt is added to the fuel material in a quantity of from 3 to 10 times the weight of the fuel and the plutonium extractant in approximately the same quantity as the double salt.

9. The process of claim 2 wherein the fuel material is a mixture of plutonium oxide and uranium oxide, and the double salt as well as the plutonium extractant are added each in a quantity of about 5 times the weight of said fuel.

No references cited.